(12) United States Patent
Boosman et al.

(10) Patent No.: US 9,734,471 B2
(45) Date of Patent: Aug. 15, 2017

(54) SYSTEMS, METHODS AND COMPUTER PROGRAM PRODUCTS FOR ADAPTIVE SELF-ORGANIZING SERVICE FOR ONLINE TASKS

(71) Applicant: udu, Inc., Raleigh, NC (US)

(72) Inventors: Franklin Carlyle Boosman, Kent, WA (US); Charles Everett Crocker, III, Chapel Hill, NC (US); Richard Harris, Perthshire (GB)

(73) Assignee: UDU, INC., Raleigh, NC (US)

( * ) Notice: Subject to any disclaimer, the term of this patent is extended or adjusted under 35 U.S.C. 154(b) by 0 days.

(21) Appl. No.: 14/337,652

(22) Filed: Jul. 22, 2014

(65) Prior Publication Data

US 2016/0026499 A1   Jan. 28, 2016

(51) Int. Cl.
*G06F 9/45* (2006.01)
*G06Q 10/06* (2012.01)
*G06F 17/30* (2006.01)

(52) U.S. Cl.
CPC ....... *G06Q 10/06* (2013.01); *G06F 17/30424* (2013.01); *G06F 17/30522* (2013.01); *G06F 17/30657* (2013.01)

(58) Field of Classification Search
None
See application file for complete search history.

(56) References Cited

U.S. PATENT DOCUMENTS

| | | | |
|---|---|---|---|
| 8,990,714 B2 * | 3/2015 | Wenig et al. | 715/763 |
| 9,189,355 B1 * | 11/2015 | Moturu | G06F 11/301 |
| 2006/0129438 A1 * | 6/2006 | Robinson | 705/6 |
| 2007/0073553 A1 * | 3/2007 | Flinn | G06N 99/005 705/1.1 |
| 2007/0094157 A1 * | 4/2007 | Flinn | G06F 8/10 706/2 |
| 2007/0203589 A1 * | 8/2007 | Flinn | G06Q 10/06 700/29 |
| 2007/0244766 A1 * | 10/2007 | Goel | 705/26 |
| 2008/0201227 A1 * | 8/2008 | Bakewell et al. | 705/14 |
| 2008/0222065 A1 * | 9/2008 | Kedrowski et al. | 706/19 |
| 2011/0225188 A1 * | 9/2011 | Lopinto | 707/770 |
| 2012/0185793 A1 * | 7/2012 | Binsztok | 715/772 |
| 2013/0268886 A1 * | 10/2013 | Sureshkumar | 715/810 |

OTHER PUBLICATIONS

Chan, Serena. "Complex Adaptive Systems." Mit.edu, Oct. 31, 2001, <web.mit.edu/esd.83/www/notebook/Complex%20Adaptive%20Systems.pdf>. Accessed Mar. 31, 2017.*

* cited by examiner

*Primary Examiner* — Wei Zhen
*Assistant Examiner* — Binh Luu
(74) *Attorney, Agent, or Firm* — Sage Patent Group

(57) ABSTRACT

Provided are systems, methods and computer program products. Embodiments may include methods that include receiving a query that includes multiple requests, each including target data and corresponding to different respective attributes of the query, and selectively and iteratively executing a portion of multiple elemental computer programs responsive to different ones of the requests. Ones of the elemental computer programs are configured to be executed to provide a portion of target values corresponding to respective ones of the requests. More than one of the elemental computer programs are executed to provide, in aggregate, target values corresponding to the target data.

21 Claims, 12 Drawing Sheets

SYSTEMS, METHODS AND COMPUTER PROGRAM PRODUCTS FOR ADAPTIVE SELF-ORGANIZING SERVICE FOR ONLINE TASKS

BACKGROUND

While online activities such as communication, presentation of content, and search may be broadly universal, actually doing anything with the information we find and share may require identification and iterative access corresponding to multiple different internal 'silos' of online services. Shopping for particular items, booking a complex trip, or scheduling events with multiple participants may require a great deal of user time and considerable duplication of effort and input. There may also be tasks that cannot be completed online, but the outcome of which must be integrated with our online activities.

A next step in the development of the online world may include the development of services capable of accessing multiple other services against specific requests of arbitrary complexity, then presenting the results to the originator of the request. Such services thereby create a universal means of carrying out complex tasks. The monolithic development and support of such universal services would however consume exponentially rising levels of resources making them fundamentally uneconomical.

SUMMARY

As disclosed herein, the application of an analogy of a biological adaptive system to the principle of an application service provider, may provide a generalized and scalable platform for accessing services and performing functions thereby.

For example, disclosed herein is an online service that provides an adaptive system of adaptive, self-organizing software n-apps which both collaborate and compete to solve arbitrary, iterative and complex requests.

Some embodiments herein include systems, methods and computer program products for an adaptive self-organizing service for complex tasks. A computer system according to some embodiments includes a processor and a memory coupled to the processor. The memory may include computer readable program code embodied therein that, when executed by the processor, causes the processor to perform any of the operations including executing an elemental computer program in the computer readable program code responsive to a portion of a request received by an adaptive environment manager program. In some embodiments, the elemental computer program, when executed by the processor, causes the processor to perform operations including receiving, via the adaptive environment manager program, at least one input data value corresponding to a primary input of the elemental computer program, performing an action corresponding to the at least one input that was received and to a function that is identified in the elemental computer program, and sending a request to the adaptive environment manager corresponding to results from performing the action.

In some embodiments, the elemental computer program, when executed by the processor, causes the processor to receive, via the adaptive environment manager program, multiple input data values that correspond to the primary input and at least one optional input of the elemental computer program.

Some embodiments provide that the elemental computer program, when executed by the processor, causes the processor to receive, via the adaptive environment manager program, a target data identifier that corresponds to a target value of the function in the elemental computer program.

In some embodiments, performing the action corresponding to the at least one input that was received and to the function that is identified in the elemental computer program includes generating data corresponding to the at least one input that was received based on functionality residing within the elemental computer program.

Some embodiments provide that performing the action corresponding to the at least one input that was received and to the function that is identified in the elemental computer program comprises receiving data from an external data source that is unrelated to the computer system. In some embodiments, the external data source includes a third party data provider, a third party service provider and/or a user via a user interface.

Some embodiments provide that sending the request to the adaptive environment manager corresponding to results from performing the performed action includes sending a mutation request to modify the request received by the adaptive environment manager program and that includes mutation data for modifying the request received by the adaptive environment manager program. In some embodiments, the mutation data includes a source field that includes an identity of the elemental computer program and data corresponding to a target value of the function in the elemental computer program.

In some embodiments, sending the request to the adaptive environment manager program corresponding to results from performing the performed action includes sending a failure message indicating that the function in the elemental computer program did not provide data corresponding to a target value of the function in the elemental computer program.

Some embodiments include, before executing the elemental computer program, providing multiple elemental computer programs for selective execution by the adaptive environment manager program, receiving a query from a user via an application programming interface (API), the query including multiple requests, and selecting at least one of the elemental computer programs to provide target data corresponding to at least one of the requests. In some embodiments, selecting the at least one of the elemental computer programs includes determining ones of the requests that are available to be processed by one or more of the elemental computer programs, and determining a match between a data value in the ones of the requests with any primary input in ones of the elemental computer programs.

In some embodiments, selecting the at least one of the elemental computer programs further includes executing two or more of the elemental computer programs responsive to determining the match between the data value in ones of the requests and the primary inputs in the ones of the elemental computer programs. Some embodiments provide that selecting the at least one of the elemental computer programs includes executing two or more of the elemental computer programs based on different data values in the same one of the requests.

Some embodiments provide that one of the requests is a modified request based on a previously occurring processing by a first one of the elemental computer programs that provide a portion of target data corresponding to the request. In some embodiments, selecting the at least one of the elemental computer programs includes determining that the at least one of the elemental computer program has not been previously executed for the same one of the requests.

In some embodiments, selecting the at least one of the elemental computer programs includes determining that the at least one of the elemental computer programs has not been previously executed for the same one of the requests.

Some embodiments provide that selecting the at least one of the elemental computer programs includes serially selecting a portion of the elemental computer programs to provide the target value corresponding to the request and that the portion of the elemental computer programs that are serially selected are a chain of elemental computer programs that provide the target value. In some embodiments, the chain of elemental computer programs includes a first chain and the portion of the elemental computer programs includes a first portion of the elemental computer programs. Some embodiments provide that selecting the at least one of the elemental computer programs includes, independently of the first chain, serially selecting a second portion of the elemental computer programs to provide the target value corresponding to the request. The second portion of the elemental computer programs that are serially selected may be a second chain of elemental computer programs that provide the target value. Some embodiments include receiving a chain selection input corresponding to selecting one of the first chain or the second chain. Some embodiments include identifying the selected ones of the elemental computer programs in the selected chain and collecting revenue from at least one of a sponsor and an end-point-service provider of the selected ones of the elemental computer programs in the selected chain.

Some embodiments include sending developer revenue shares to developers of the selected ones of the elemental computer programs in the selected chain. Some embodiments include sending a portion of the collected revenue to a system operator of the computer system.

Some embodiments include identifying the selected ones of the elemental computer programs in the selected chain and associating a positive performance metric corresponding to the selected ones of the elemental computer programs in the selected chain. In some embodiments, unselected ones of the elemental computer programs are not associated with the positive performance metric.

Some embodiments of the present invention include methods that include receiving a query that includes multiple requests, each including target data and corresponding to different respective attributes of the query, selectively and iteratively executing a portion of multiple elemental computer programs responsive to different ones of the requests. In some embodiments, ones of the elemental computer programs are configured to be executed to provide a portion of target values corresponding to respective ones of the requests. Some embodiments provide that more than one of the elemental computer programs are executed to provide, in aggregate, target values corresponding to the target data.

In some embodiments, ones of the elemental computer programs are configured to access one or more external services and/or sources to provide the respective portions of the target values.

Some embodiments include serially selecting the more than one of the elemental computer programs that are executed to provide the target values corresponding to the request. In some embodiments, the portion of the elemental computer programs that are serially selected are a chain of elemental computer programs that provide the target value. Some embodiments provide that the chain of elemental computer programs includes a first chain, the portion of the elemental computer programs includes a first portion of the elemental computer programs, and serially selecting the more than one of the elemental computer programs includes, independently of the first chain, serially selecting another portion of the elemental computer programs to provide the target value corresponding to the request. Some embodiments provide that the another portion of the elemental computer programs that are serially selected are a second chain of elemental computer programs that provide the target value. Some embodiments include receiving a chain selection input corresponding to selecting one of the first chain or the second chain.

Some embodiments include identifying the selected ones of the elemental computer programs in the selected chain and associating a positive performance metric corresponding to the selected ones of the elemental computer programs in the selected chain. In some embodiments, unselected ones of the elemental computer programs are not associated with the positive performance metric.

Some embodiments of the present invention include computer program products that include a computer readable storage medium having computer readable code embodied in the medium, the computer code comprising computer readable code to perform operations as disclosed herein.

It is noted that aspects of the inventive concept described with respect to one embodiment, may be incorporated in a different embodiment although not specifically described relative thereto. That is, all embodiments and/or features of any embodiment can be combined in any way and/or combination. These and other objects and/or aspects of the present inventive concept are explained in detail in the specification set forth below

BRIEF DESCRIPTION OF THE DRAWINGS

The accompanying figures are included to provide a further understanding of the present inventive concept, and are incorporated in and constitute a part of this specification. The drawings illustrate some embodiments of the present inventive concept and, together with the description, serve to explain principles of the present inventive concept.

DETAILED DESCRIPTION

Figure 1:
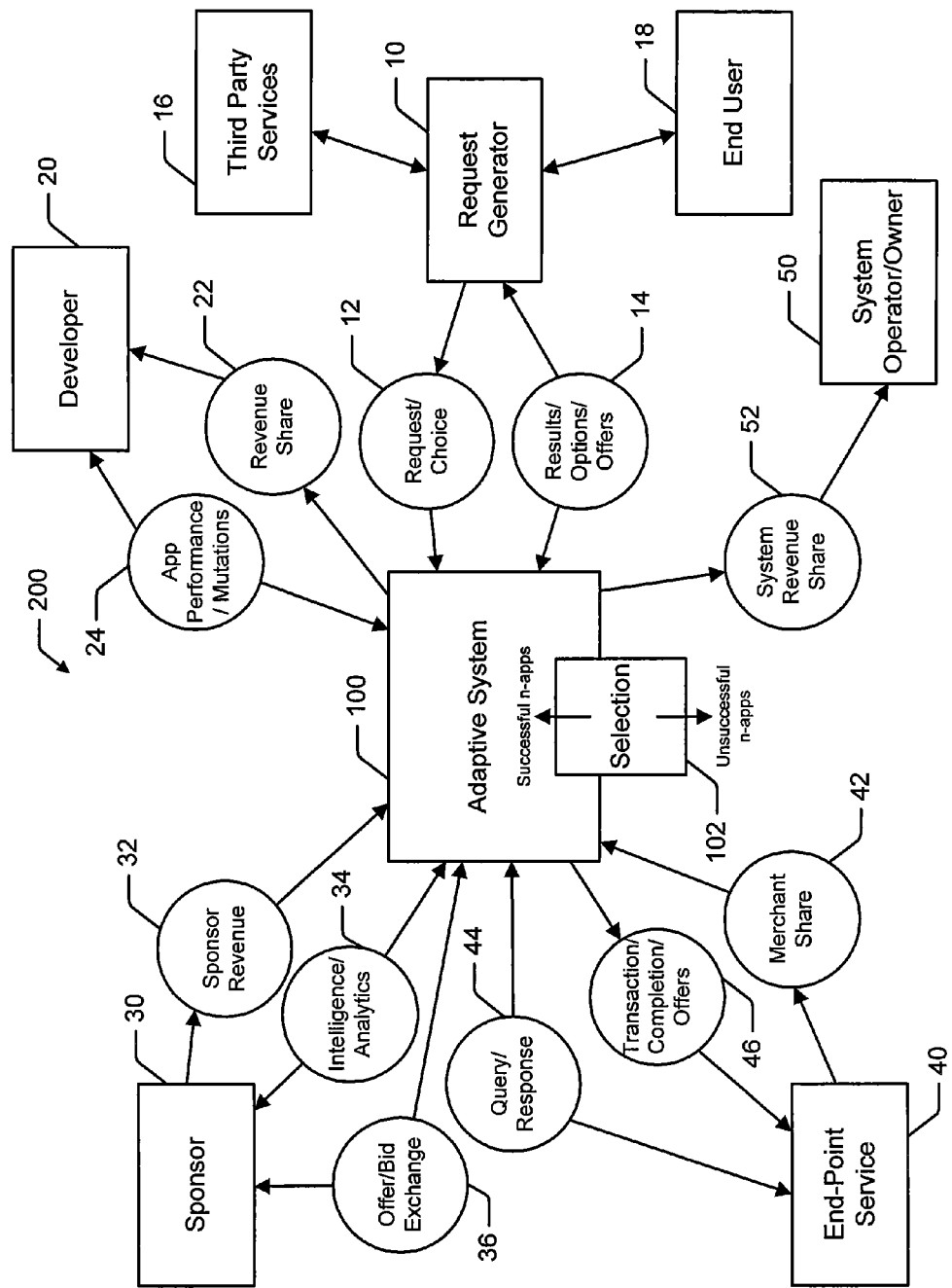
FIG. 1 is a block diagram illustrating a schematic view of an overall environment for systems, methods, and computer program products in accordance with some embodiments of the present invention, including the classes of external entities (people, organizations and services) with which embodiments of the invention may interact.

The present invention now will be described hereinafter with reference to the accompanying drawings and examples, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art.

Like numbers refer to like elements throughout. In the figures, the thickness of certain lines, layers, components, elements or features may be exaggerated for clarity. The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof. As used herein, the term "and/or" includes any and all combinations of one or more of the associated listed items. As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

It will be understood that when an element is referred to as being "on," "attached" to, "connected" to, "coupled" with, "contacting," etc., another element, it can be directly on, attached to, connected to, coupled with or contacting the other element or intervening elements may also be present. In contrast, when an element is referred to as being, for example, "directly on," "directly attached" to, "directly connected" to, "directly coupled" with or "directly contacting" another element, there are no intervening elements present. It will also be appreciated by those of skill in the art that references to a structure or feature that is disposed "adjacent" another feature may have portions that overlap or underlie the adjacent feature.

Spatially relative terms, such as "under," "below," "lower," "over," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is inverted, elements described as "under" or "beneath" other elements or features would then be oriented "over" the other elements or features. Thus, the exemplary term "under" can encompass both an orientation of "over" and "under." The device may be otherwise oriented (rotated 90 degrees or at other orientations) and the spatially relative descriptors used herein interpreted accordingly. Similarly, the terms "upwardly," "downwardly," "vertical," "horizontal" and the like are used herein for the purpose of explanation only unless specifically indicated otherwise.

It will be understood that, although the terms "first," "second," etc. may be used herein to describe various elements, these elements should not be limited by these terms. These terms are only used to distinguish one element from another. Thus, a "first" element discussed below could also be termed a "second" element without departing from the teachings of the present invention. The sequence of operations (or steps) is not limited to the order presented in the claims or figures unless specifically indicated otherwise.

The present invention is described below with reference to block diagrams and/or flowchart illustrations of methods, apparatus (systems) and/or computer program products according to embodiments of the invention. It is understood that each block of the block diagrams and/or flowchart illustrations, and combinations of blocks in the block diagrams and/or flowchart illustrations, can be implemented by computer program instructions. These computer program instructions may be provided to a processor of a general purpose computer, special purpose computer, and/or other programmable data processing apparatus to produce a machine, such that the instructions, which execute via the processor of the computer and/or other programmable data processing apparatus, create means for implementing the functions/acts specified in the block diagrams and/or flowchart block or blocks.

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the block diagrams and/or flowchart block or blocks.

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions/acts specified in the block diagrams and/or flowchart block or blocks.

Accordingly, the present invention may be embodied in hardware and/or in software (including firmware, resident software, micro-code, etc.). Furthermore, embodiments of the present invention may take the form of a computer program product on a computer-usable or computer-readable non-transient storage medium having computer-usable or computer-readable program code embodied in the medium for use by or in connection with an instruction execution system.

The computer-usable or computer-readable medium may be, for example but not limited to, an electronic, optical, electromagnetic, infrared, or semiconductor system, apparatus, or device. More specific examples (a non-exhaustive list) of the computer-readable medium would include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM).

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Javascript, Python, Ruby and Groovy, or other programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider), in a cloud computer environment, or offered as a service such as a Software as a Service (SaaS).

The disclosure herein may provide a generalized development and operating platform for third-party apps (henceforth referred to as 'nano-apps' or 'n-apps'). The services may give n-apps the ability to collaborate to break down complex requests into their component tasks, find solutions for each of those tasks and offer multiple, ranked potential solutions for the entire request (chains) to the user who created it. The user may then choose which, if any, of these chains to enact.

Embodiments as disclosed herein may continuously up- or down-select n-apps according to their effectiveness, whenever information becomes available that allows an assessment of the effectiveness of either an individual n-app or of the collective effectiveness of a Chain of n-apps. Selection takes place both in general, and against each user's needs. The system thereby provides service providers, system providers, n-apps directly and/or n-app developers with drivers for the evolution of n-app capability and effectiveness. Continuous feedback may be provided to the developers of each n-app about that n-app's performance and fitness for its purpose, enabling rapid iteration of capability. Some embodiments provide n-apps that are self-modifying, learning and adapting their capability in response to their success at solving their designated tasks.

A revenue model corresponding to the operation of services and products disclosed herein may be predicated on a) an associate share of final transaction revenues and/or b) sponsorship of an entire request or part of a request. In the case of sponsorship, sponsors can be provided with very detailed and/or anonymized behavioral data about a request and the opportunity to permissively build a direct relationship with the user. Some embodiments provide that revenues may be shared between a service provider, system provider and/or the developers of successful n-apps. Elements of revenue will also be used to incentivize and reward users and other entities with which service and/or system provider interacts.

Some embodiments provided herein include the combination of the concept of software 'organisms' that may interact without requiring a priori knowledge of each other, the notion of adaptive and self-organizing software systems, and the notion of a curated app store containing many thousands or even millions of highly focused apps in a system that combines all of these concepts into a true (i.e., not simply metaphorical) operating adaptive system aimed at solving real tasks through a combination of self-determination and reference to services external to the adaptive system. For example, a user may interact using one or more software driven interfaces and/or types thereof that may not themselves be considered as n-apps. The user interaction may include a request, which may be decomposed into tasks that each may attract one or more n-apps to attempt to fulfill the respective tasks.

Reference is now made to FIG. 1, which is a block diagram illustrating a schematic view of an overall environment for systems, methods, and computer program products in accordance with some embodiments of the present invention, including the classes of external entities (people, organizations and services) with which embodiments of the invention may interact. Some embodiments of the present invention may include a three-pass system that includes operations corresponding to searching, enacting and sharing.

Some embodiments provide that searching may include operations in which multiple n-apps, which may be elemental computer programs that are configured to fulfill small component tasks corresponding to an otherwise complex request, collaborate to fulfill the request. Some requests may include varying levels of dependency among the different tasks and corresponding n-apps in the request. The collaborating n-apps may create multiple different chains of potential solutions to the request. The competing chains of potential solutions may be generated by multiple different n-apps and/or the same combination of n-apps arranged in different orders to solve the request. Some embodiments provide that sponsorship may be obtained on a bid/offer basis for each chain.

In some embodiments, enacting operations may include those in which a user chooses the chain of solutions that they wish to enact. Once selected, a chain may go back to the fulfillment points (e.g., the end-point services or EPS) and execute all transactions defined in the chain, subject to user selection and/or refinement.

Some embodiments provide that sharing operations may include those in which the system collects all revenue due against all chains that have generated revenue and ripples that revenue through the system according to one or more revenue share algorithms.

As illustrated in FIG. 1, an adaptive system 100 may receive a request 12 via a request generator 10, which may include an application programming interface that may receive requests and/or data from third-party services 16 and/or an end-user 18. Various components of the adaptive system 100 may interact with an end-point service 40 to send and/or receive a query and/or response, respectively 44. To the extent that one or more n-apps in a selected chain correspond to an endpoint service 40, the transaction, completion and/or offers may be performed and/or communicated 46.

Intelligence/analytics 34 corresponding to a successful chain may be provided to a sponsor 30 to bid for sponsorship of the chain. Some embodiments provide that an offer/bid exchange 36 may occur regarding sponsorship of the chain.

Some embodiments provide that a developer 20 of an n-app may receive and/or send n-app performance data and/or n-app mutations 24, respectively responsive to the performance data.

In some embodiments, the request generator 10 may provide a choice 12 corresponding to a chain of n-apps that solve the request. The choice may be provided by third party services 16 and/or an end user 18. Additionally, results, options and offers 14 may be communicated to and/or by third party services 16 and/or an end user 18 via the request generator 10.

Some embodiments provide operations regarding revenue generation and distribution. For example, a merchant share 42 may be provided by a selected end-point service 40 and sponsor revenue 32 may be provided by sponsors 30 of chains and/or n-apps. A revenue share 22 may be provided to developers 20 and a system revenue share 52 may be provided to a system operator/owner 50. Additionally, performance of various ones of the n-apps may be determined in the adaptive system 100 via one or more selection operations 102. In this manner, successful n-apps may be promoted and/or ranked higher than unsuccessful n-apps.

Figure 2:
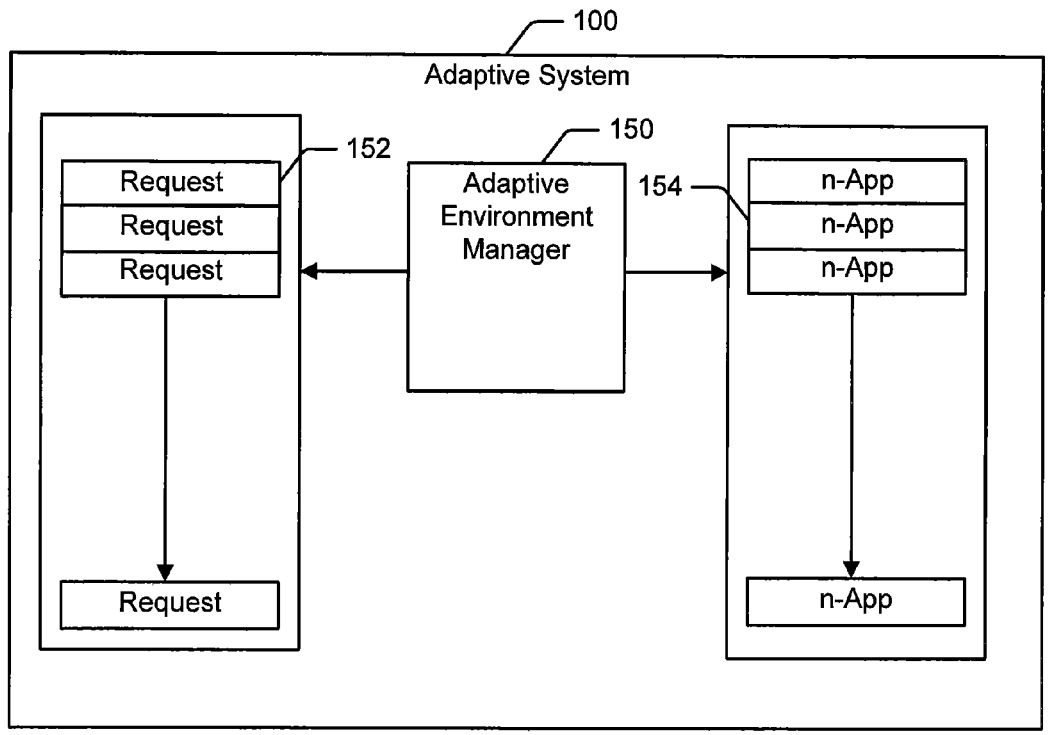
FIG. 2 is a block diagram illustrating an adaptive system according to some embodiments of the present invention.

Brief reference is made to FIG. 2, which is a block diagram illustrating an adaptive system according to some embodiments of the present invention. The adaptive system includes an adaptive environment manager 150 that is configured to receive and process queries and/or requests 152 for tasks to be performed by the adaptive system 100. The adaptive system 100 may store and/or manage storage of the requests 152. In some embodiments, the queries and/or requests 152 may be received though an application programming interface (API) (not shown). The adaptive system 100 may include one or more n-apps 154 that are configured to perform simple tasks, including, for example, portions of tasks and/or requests. As used herein, the n-apps may be referred to as elemental computer programs. Some embodiments provide that n-apps 154 are configured to perform tasks in collaboration with other n-apps 154 in the absence of awareness regarding what tasks other n-apps are performing.

Figure 3:
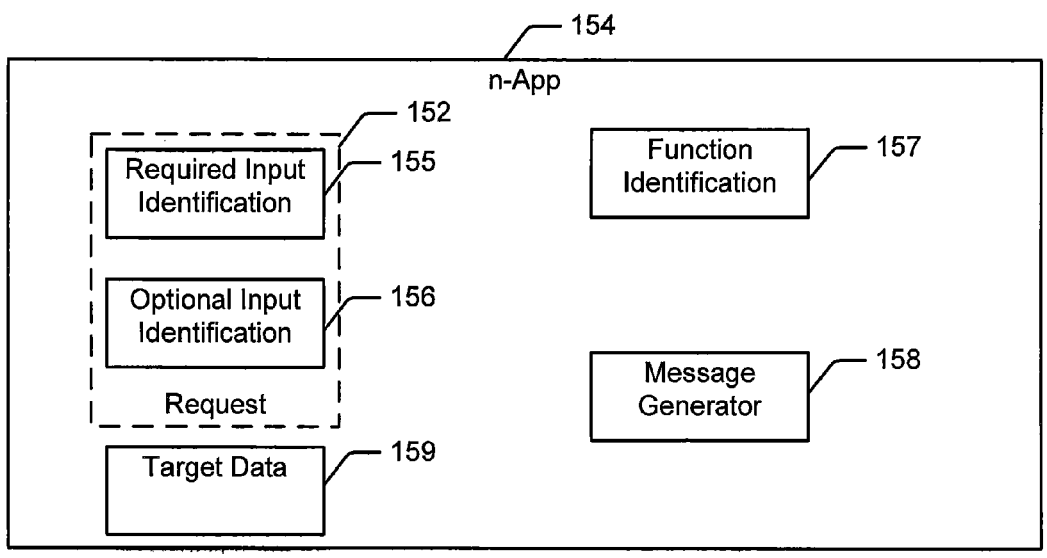
FIG. 3 is a block diagram illustrating a schematic view of an n-app and components thereof according to some embodiments of the present invention.

Brief reference is now made to FIG. 3, which is a block diagram illustrating a schematic view of an n-app and components thereof according to some embodiments of the present invention. The n-app 154 may include a required input identification 155 that identifies one or more inputs that are required for the n-app to be selected by the adaptive environment manager 150 for execution. The n-app 154 may include an optional input identification 156 that identifies one or more inputs that may be included in a request 152 and may be used by the n-app 154 to perform the task. The n-app 154 may also include target data 159 that identifies template data corresponding to the task. A function identification 157 may identify the function and/or process is performed on the required and/or optional input data. Based on the result of the function and/or process, a message generator 158 generates and sends a message to the adaptive environment manager 150.

At each stage in the process, successful n-apps are up-selected, increasing their chance of participating in similar requests and in requests by that user in the future. Similarly, unsuccessful n-apps are down-selected, reducing their chances of future participation.

Figure 4A:
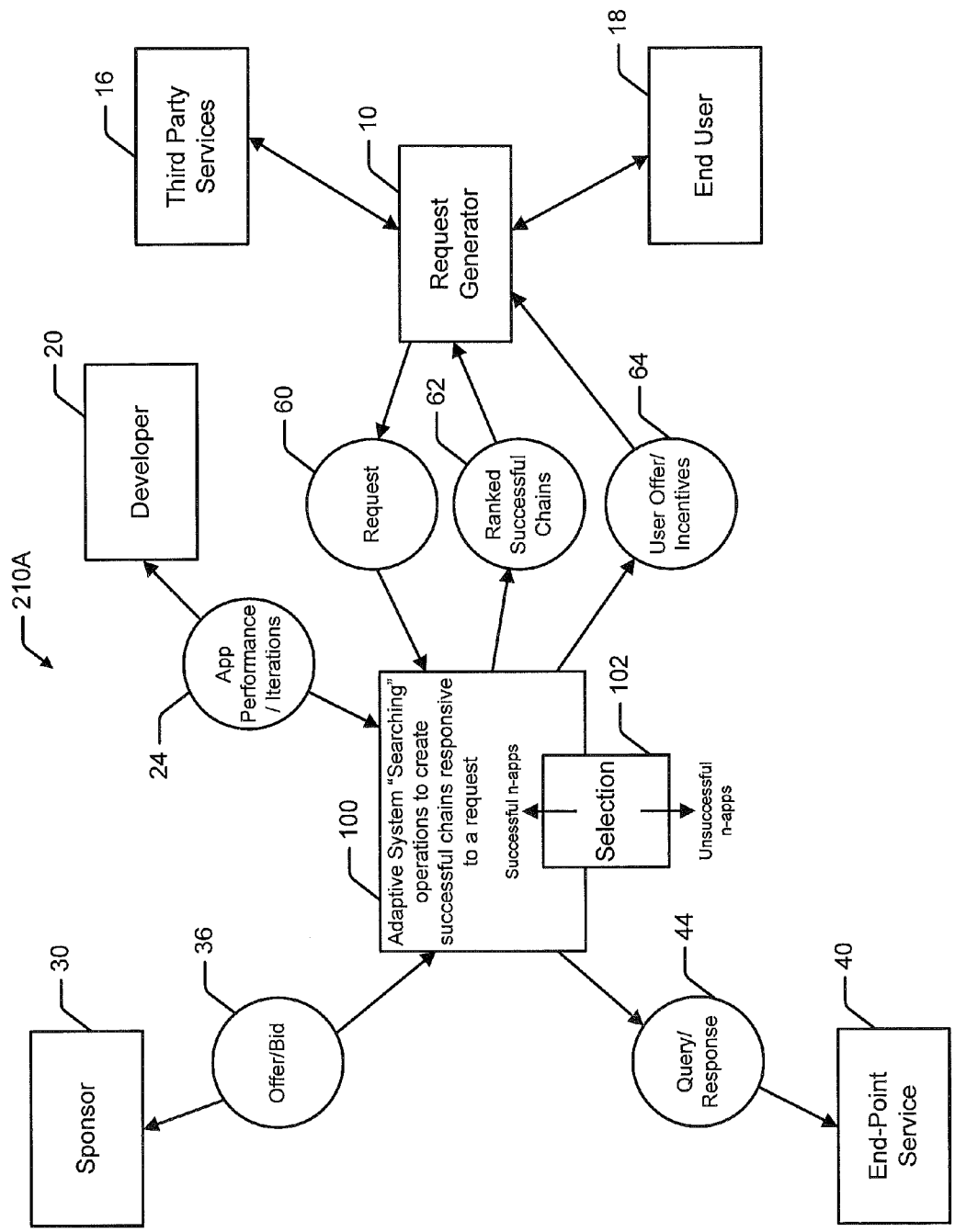
FIGS. 4A-C are block diagrams illustrating a schematic views of an overall environment for systems, methods, and computer program products in accordance with some embodiments of the present invention at searching, enacting and sharing operational stages, respectively, including the classes of external entities (people, organizations and services) with which some embodiments of the invention may interact.
Figure 4B:
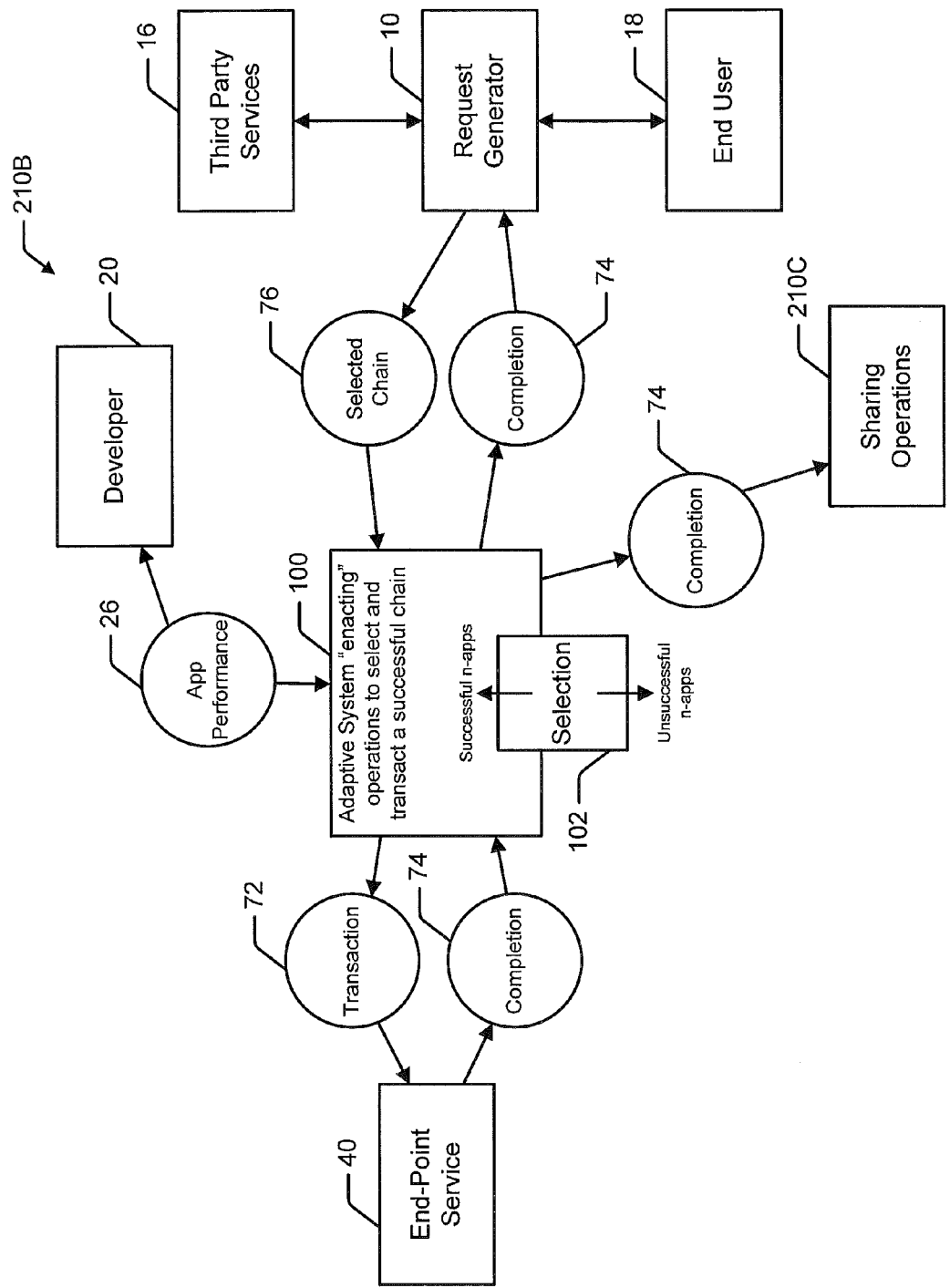
Figure 4C:
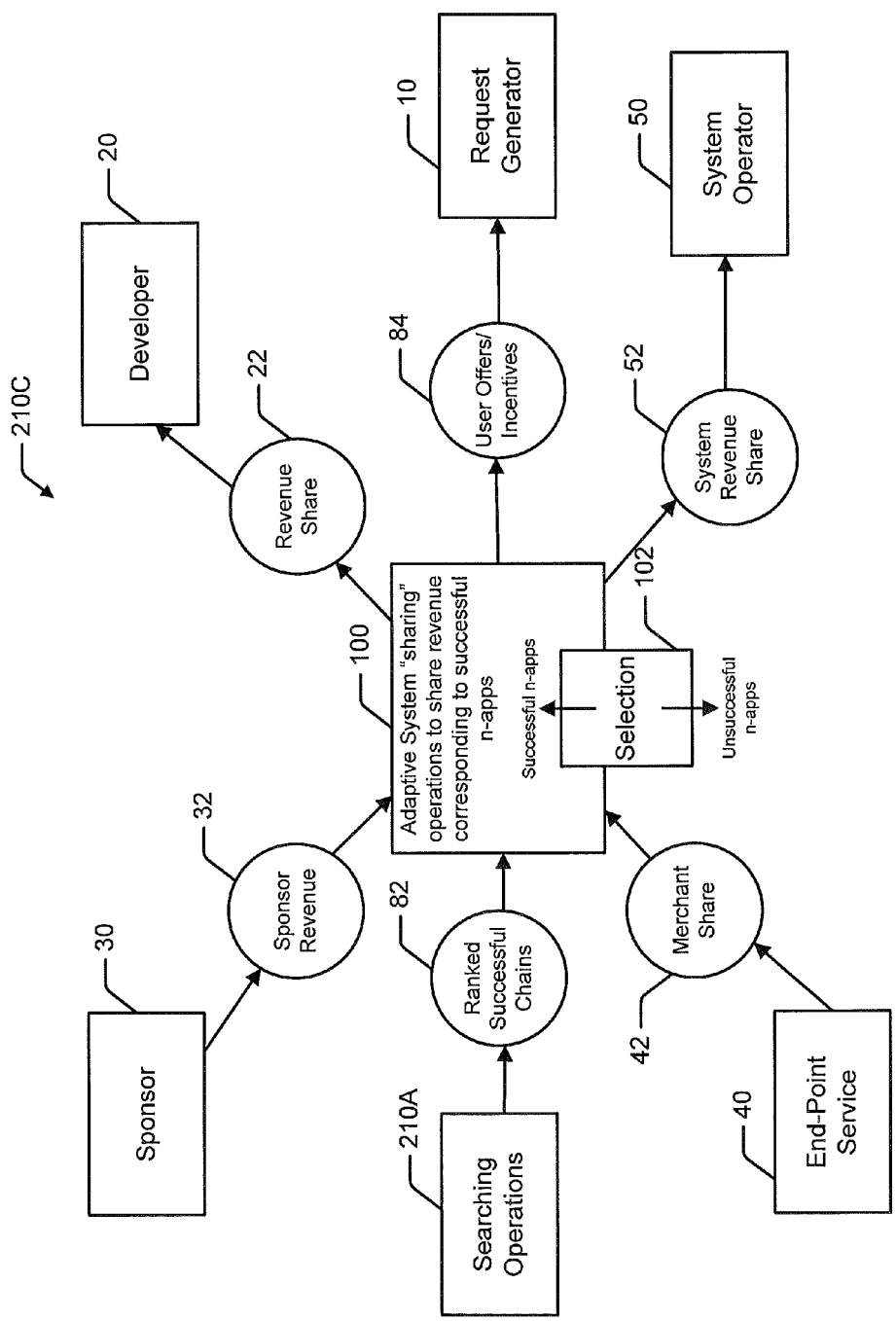

Reference is now made to FIGS. 4A-C, which are block diagrams illustrating a schematic views of an overall environment for systems, methods, and computer program products in accordance with some embodiments of the present invention at searching, enacting and sharing operational stages, respectively, including the classes of external entities (people, organizations and services) with which some embodiments of the invention may interact. As illustrated, FIGS. 4A-C are generally representative of the systems, methods, and computer program products illustrated in FIG. 1, but at the different stages of operation.

Referring to FIG. 4A, searching operations 210A may start with the creation of a multi-element request 60 from user 18, either directly via a system interface and/or device or through integration with a third-party query service 16. For example, the end user 18 and/or a third party service 16 may interface with the request generator 10 to generate the request 60 to be submitted to the adaptive system 100. The search may end with the presentation to the end-user 18 of a series of ranked results from successful chains 62, any of which may be chosen to be enacted. A user may also be presented with user offers and/or incentives 64. In some embodiments, an end user 18 may choose only certain tasks from a chain to be enacted and/or may use the information returned to them to modify and resubmit the original request. Other portions of FIG. 4A were discussed above regarding FIG. 1 and thus will not be discussed again.

Referring to FIG. 4B, in some embodiments, enactment starts with the selection 76 by the end-user 18 of one of the successful request chains for execution. Enactment may end with the confirmation to the end-user 18 that all transactions necessary to complete all tasks in the selected chain 76 are completed 74. In some embodiments completion may also include the failure of any transaction to complete and the abandonment of the entire chain. In some embodiments, enactment operations may include communications corresponding to n-app performance data 26 between the developer 20 and the adaptive system 100. Additionally, responsive to the selected chain 76, the adaptive system 100 may execute a transaction 72 with one or more end-point services 40, which may communicate the completion(s) 74 thereof. Some embodiments provide that completion of the selected chain results in a transition from the enacting operations to the sharing operations 210C.

Referring to FIG. 4C, sharing operations may be relatively offline compared to the searching and enacting operations. Sharing may include one or more functions corresponding to periodically reconciling, collecting and attributing the value shares that are generated by the systems, methods and computer program products. Some embodiments provide that currencies may include conventional currencies and/or any online value systems, credits and/or incentives. Based on searching operations 210A, successful chains are ranked 82. A sponsor share 32 may be provided by sponsors 30 of selected chains and/or n-apps that are included in selected chains. A merchant share 42 may be provided by end-point services 40 of selected chains and/or n-apps that are included in selected chains. A system revenue share 52 may be provided to a system operator 50 and a revenue share 22 may be provided to developers of n-apps included in selected chains. In some embodiments, user offers and/or incentives 84 may be provided to a user and/or third party service or other request generator 10.

Figure 5A:
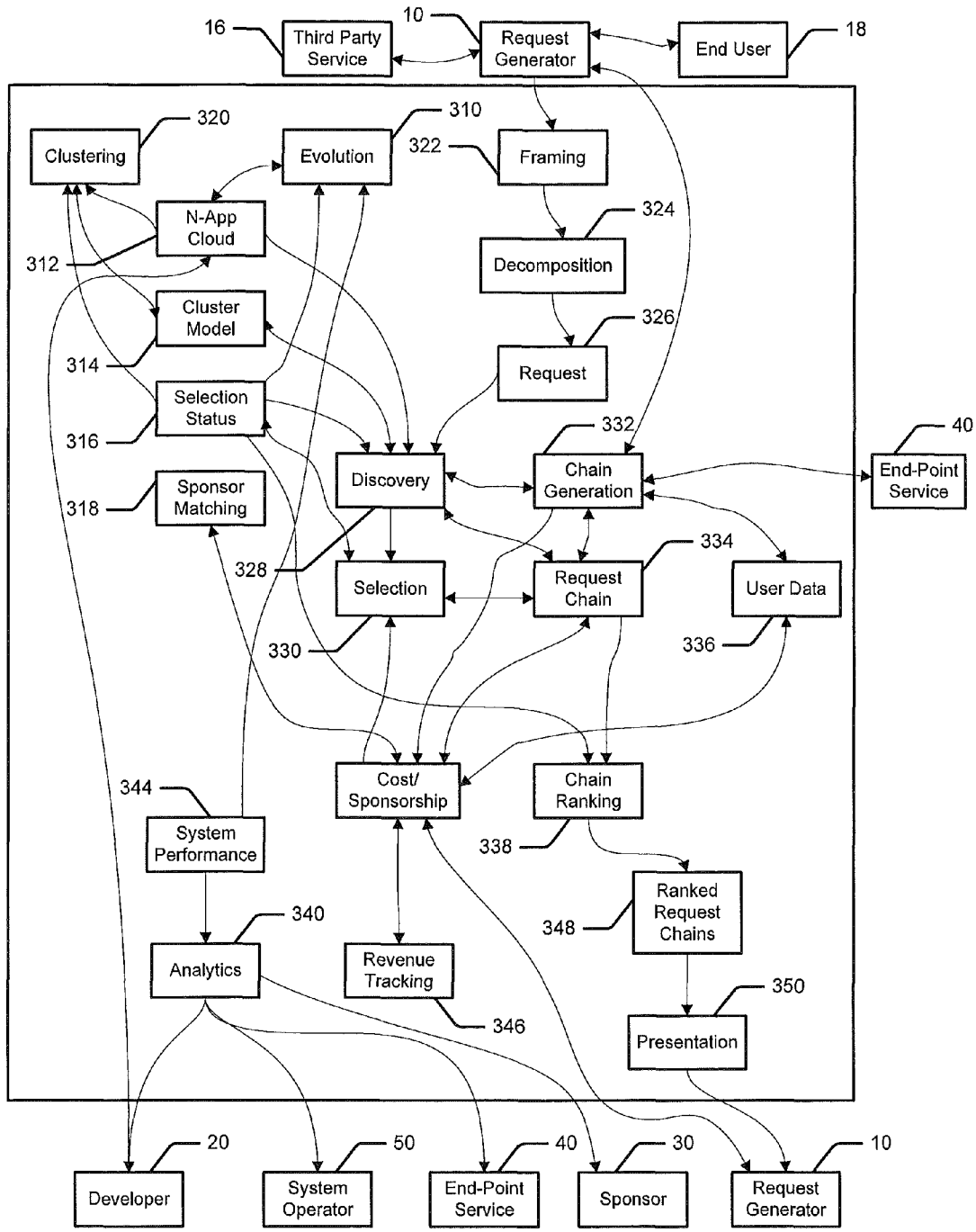
FIGS. 5A-C are flow diagrams illustrating a schematic views of operations and/or processes of systems, methods, and computer program products for searching, enacting and sharing operational stages, respectively, according to some embodiments of the present invention.
Figure 5B:
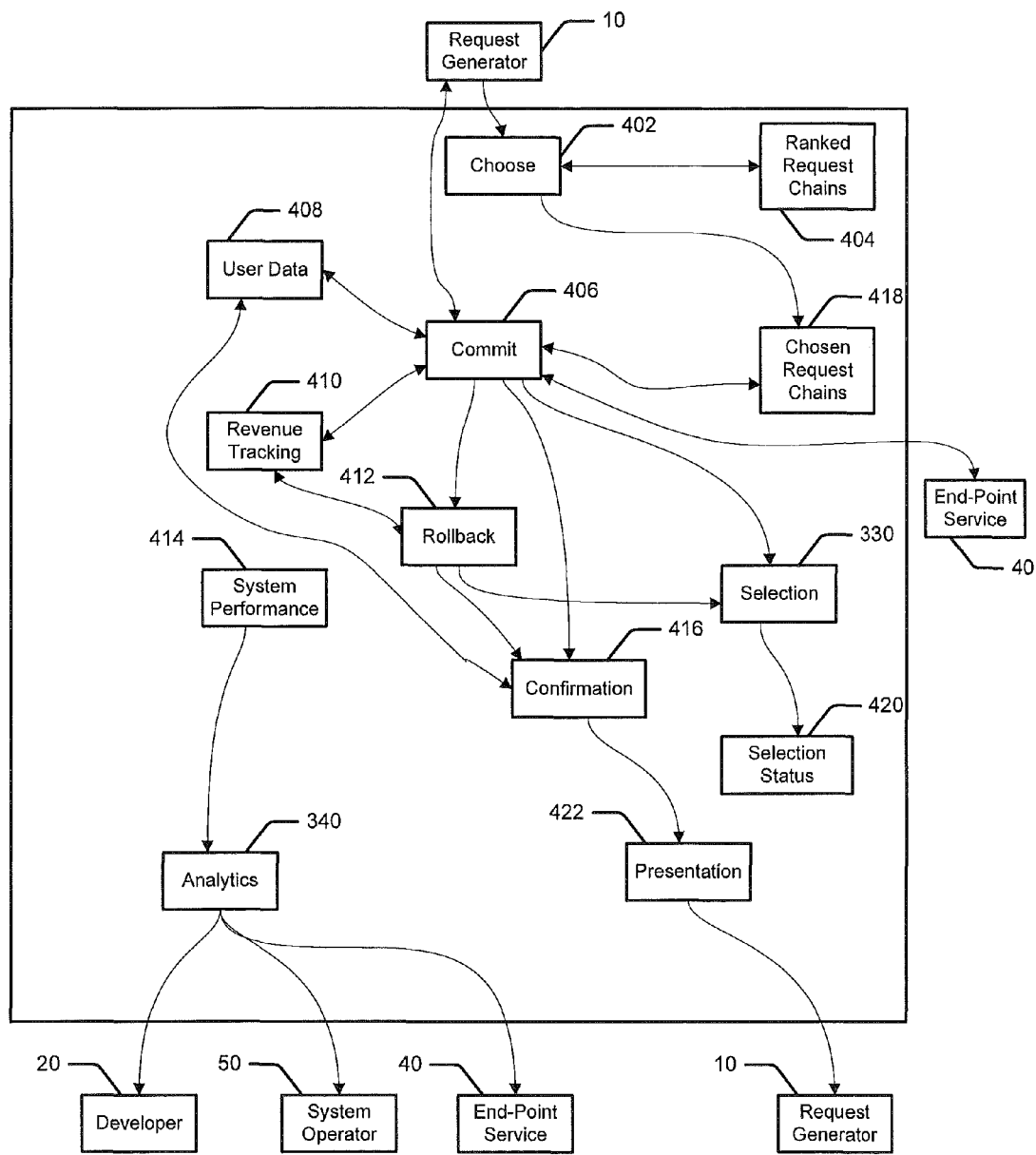
Figure 5C:
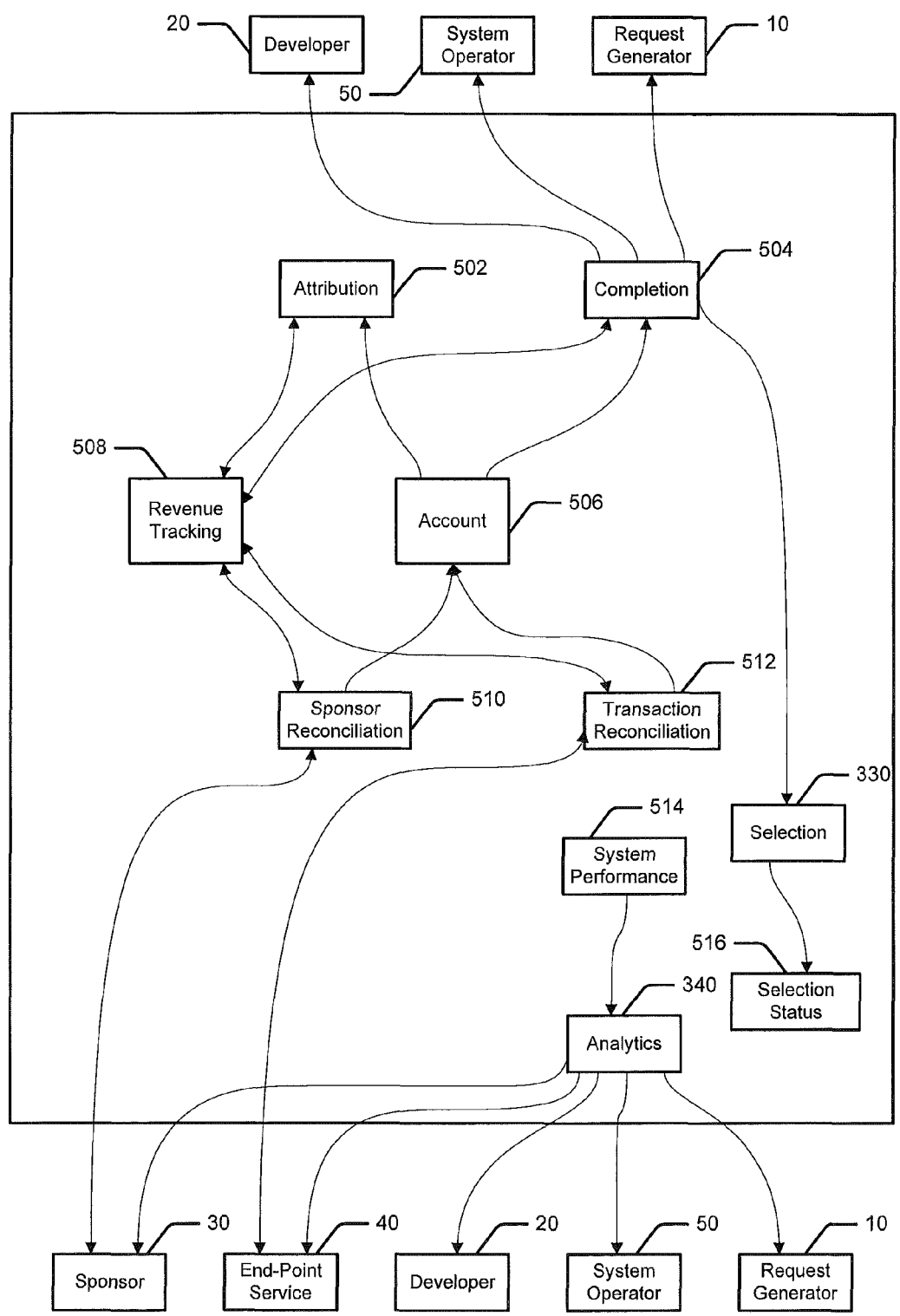

Reference is now made to FIGS. 5A-C, which are flow diagrams illustrating a schematic views of operations and/or processes of systems, methods, and computer program products in accordance with some embodiments of the present invention at searching, enacting and sharing operational stages, respectively. Referring to FIG. 5A, as illustrated, searching may begin with the creation of a multi-element request by a request generator 10 either directly from an end user 18 and/or indirectly through integration with a third party service 16. In some embodiments, the request generator 10 may include and/or interface with one or more user interfaces and/or application programming interfaces to generate and submit a request.

Framing 322 may be a process in which an end user 18 or third party service 16 creates a request via one of multiple user agents. Means by which a request may be created include but are not limited to app or web-based interfaces of any multiple types, requiring direct user input to create a request, apps or web services which use automated inferences to create requests from other data (e.g., geolocation, to do lists, calendar entries, etc.), apps or web services which generate a system request in response to other inputs where generating the system request is not visible to the end-user (e.g., voice input to a system), and/or any combination thereof. The framing process 322 may itself request further information to qualify any part of the request. Some embodiments provide that disqualification may in turn be handled by a special case of the overall system n-app process.

A decomposition process 324 provides that the received request is decomposed into component tasks, qualifications for each task and dependencies between tasks. A decomposed request, regardless of its source, is currently expressed as a list of tasks plus identified interdependencies. In some embodiments, the decomposed request may be expressed in a common pseudo-natural language (PNL). Thereafter, substantial portions of the adaptive system process may be performed using the system-wide processes of clustering 320 and selection 330. These may support processes of discovery 328, chain generation 332 and sponsorship. These processes may form a processing loop that continues until either all elements of a request have been satisfied, creating a complete response chain, or the chain fails to complete.

Discovery 328 provides that a list of tasks is introduced to the adaptive system and n-apps are matched to advertised tasks in the adaptive system against dynamic clusters that may be created by the algorithms that seek to match internal n-app and task taxonomies. Tasks may be matched to n-apps on the basis of their degree of affinity to the clustering 320 node(s) most closely associated with the task. Association with a task may also be conditioned by the selective status of each n-app. A small number of n-apps system-wide have effectively a 'level' association, in that they are recruiting to every task instance in the adaptive system, to provide universal services at the 'bacterial' level of the adaptive system. For example, a synonym n-app may resolve synonyms for different tasks and elements. Some embodiments provide that generic clustering models may be used where there is no prior history of either an advertised task or a user history for that type of task. Otherwise, the generic clustering is complemented by prior history of success and choice by each user. Every time any task is mutated or a new task created, this mechanism may be used to associate potential responder n-apps with the task.

In a chain generation process 322, each n-app that has been associated with a task will attempt to fulfill that task, through: internal algorithms (including reference to adaptive system data); interaction with external 'End-Point Services' (EPS), such as Google, Amazon, Yelp etc., seeking to obtain the information it needs to fulfill its purpose and/or to obtain and either factor in or offer the end user 18 any offers or incentives provided by the EPS; and mutating the task definition it is using in order to attract other n-apps to carry out parts of the task or to provide alternate interpretations of elements of the task. Mutation may extend the original request with new tasks that qualify the original task, provide additional information to the chain, define alternate forms for an existing task, and generate supplementary tasks required by the local n-app to qualify and complete its own task.

An n-app may further define interaction with the request originator to request further information from the end user 18 or third party service 16. Any mutation then may cause the discovery mechanism 328 to carry on a process of recruiting candidate n-apps to the new and restated tasks.

If an n-app thinks it has succeeded in populating its task (directly or through onward tasking) it may send a message to the adaptive environment manager program including data for that task only. The n-app may be up-selected by the adaptive system. If an n-app cannot fulfill a task, it may be down-selected.

Chain generation 332 may occur when multiple n-apps respond to each task of a request. In some embodiments, each first responder n-app may create its own instance of the entire request, even though it is only addressing a single task from that request. Other n-apps may be then recruited to the other tasks, creating a series of chains of response from each request instance. Each n-app may then create mutated subtasks to which other n-apps may then respond, thereby repeating the described sequence.

Within the limits of defined interdependencies, it generally does not matter what order the tasks in a request are addressed. For example, wherever a first responder n-app starts, it may generate a mutated request that may be processed by other n-apps. Some embodiments provide that tasks need not complete immediately. For example, two special cases include deferred tasks and long duration/offline tasks. Deferred tasks occur where the original request sets conditions that must be met before it can be completed. Some embodiments provide that the request as a whole cannot complete until any task with deferred conditions is able to be processed. Long duration/offline tasks may typically require human intervention in e.g. a crowd-sourcing type task. Once all tasks for a request instance are shown as successfully completed (optionally to a system-determined cut-off point or if the user terminates the process) and no more n-apps are being recruited to the problem space, then that instance may form a complete set of chains which report success. At this point all n-apps in the assembled chains are again up-selected by the adaptive system.

Regarding sponsorship 342, any request to the adaptive system can provide detailed intelligence on user intent and behavior (rather than the inference of intent from fragments of behavior used in traditional online advertising models). Each successful chain that is built against a request can further provide specific intelligence on the successful n-apps and end point services 40 involved. The value inherent in this chain intelligence may form the basis of a part of the adaptive system revenue model, whereby, as a chain builds, it may also build a value proposition that is offered on a bid basis for sponsorship by one or more chain sponsors 30.

Whilst the initial intelligence provided to sponsors 30 is anonymized, the adaptive system may also include providing sponsors 30 with the opportunity to permissively build a direct personalized relationship with the end user 18. That in turn may incur a higher sponsorship offer to bid, with the value generated from that personalized sponsorship being available for sharing with the user. To drive this sponsorship model, any n-app may have assigned a "minimum cost to execute" (MCE). This may be either determined by an actual cost incurred by the execution of the n-app (machine time, use of a charged API to an EPS, etc.) or a more or less arbitrary value charge imposed by the developer 20 and updated in response to adaptive system feedback.

The matching of sponsors 318 to tasks and thence to chains may be carried out by a process analogous to the discovery process 328 for mapping n-apps to tasks. When an n-app is recruited to a task, it offers its MCE as a threshold for sponsorship of that task, the reward to sponsors however being knowledge of the entire request. If no sponsor is willing to meet the MCE of a first responder n-app, the chain dies. Whenever any other n-app is recruited to a request instance, it's MCE may be added to that of the others building for that request instance and the whole is offered again for sponsorship 342. If the sum total of sponsorship available from multiple sponsors equals or exceeds the sum of the participating n-apps MCEs, then the building of that chain continues.

At any point where sponsorship is successfully negotiated, the sponsor is committed to payment and is provided with the basic anonymized request data. When further sponsorship is offered as the chain builds, the process of sponsorship/provision of request data is repeated. A single request may therefore generate multiple sponsorship streams. The adaptive system may manage the exclusion of competing or otherwise incompatible co-Sponsors. In some embodiments, any n-app that sets a MCE that is too high for the market is naturally down-selected and continues to be so until it effectively excludes itself from the adaptive system. In some embodiments, part of an intelligence dashboard may be provided to developers 20 by the analytics process 340 to track the performance of any n-app against its MCE. Sponsors 30 may have access to an analytic dashboard for both their own sponsored chains and for broader trends. Once sponsored, n-apps in chains are up-selected by the adaptive system as they have generated revenue.

Chain ranking 338 provides that successful chains are ranked by multiple mechanisms, including the sum of success metrics for each n-app, the individual end user's history and the selective status of the n-apps in each purportedly successful chain.

A final stage of the search process includes presentation 350 in which the ranked successful chains 348 are combined with the relevant sponsorship data and presented to the request generator 10, along with any offers and incentives generated against their request. This may take place either via an adaptive system controlled application or Web interface or by a formatted message returned to the third party service 16 of the end user 18.

Some embodiments provide that the searching operations may end with the presentation 350 of one or more ranked results from successful chains of n-apps, to the end user 18, via the request generator 10.

Reference is now made to FIG. 5B illustrating that enactment may begin with the selection by the request generator 10 of one of the successful request chains for execution. A request generator 10 may choose a chain 402 that they wish to execute immediately. Some embodiments provide that no further up/down selection is made at this point. The request generator 10 may select the whole chain and/or may selectively choose a subset of that chain for execution, subject to any inter-task dependencies in that chain. For example, a chain may be saved for execution at a later time. This may result in the chain being reinvoked at a later stage with the same n-apps, should they still exist (including updated mutations). In this case, no further up/down-selection may be made.

In some embodiments, a chain may be shared with others. In this case, the recipients may either execute a chain against their own account or execute on behalf of the original user, should they be a nominated proxy. Some embodiments provide that it may be possible to publicly share a chain. In some embodiments, no further up/down selection may be made until the chain is run again.

Some embodiments provide that a chain may be deferred until certain conditions are satisfied. An example of such conditions include a chain that has failed, not because the n-apps can't do the job (in which case there is no chain), but where the conditions cannot yet be met (e.g. the tickets for the pre-announced event are not on sale yet). The chain may be caused to persist until the conditions are met, at which time the chain may execute the task for the user. In such cases, no further up/down-selection may be made until the chain has successfully enacted.

A commit process 406 provides that a chain selected for execution may now facilitate completion of the transactions required of it. It may do so either by presenting transactions for input of payment details by the user or by carrying out all transactions within the adaptive system, using either payment data already stored by the user with end-point services 10, with third party services, or stored within a user's account in the adaptive system itself.

A confirmation process 416 provides a confirmation regarding whether a chain has successfully committed 406 or whether it has failed with an appropriate rollback 412. The result, with all appropriate EPS confirmations and references, may be collated into a consistent format for presentation 422 to the request generator 10. Up-selection may be made both generically for the n-apps in a successfully completed chain and against those n-apps in the request generator's 10 history.

A rollback process 412 may be used to back out of or cancel all transactions in a chain, should any particular transaction fail. Should anything prevent the adaptive system from fulfilling the entirety of the request, then it can fail safe, offer to complete the transaction or offer alternatives to the transaction. A fail safe may ensure that none of the transactions has taken place. In this case, the n-app interacting with the cause of the failure may be down-selected. In the event of rollback 410, revenue tracking 410 may be affected. An offer to complete may correspond to the non-dependent elements of the request, with agreement from the request generator 10. An offer to look corresponds to alternatives to the elements of the request that could not be enacted. In this event, no further up/down selection may be made at this stage.

Some embodiments provide that a presentation process 422 may be performed using an adaptive system controlled application and/or a Web. In some embodiments, the presentation 422 may be performed using a formatted message returned to the third party service from which the request originated.

Some embodiments provide that enactment may end with confirmation 416 to the request generator 10 either that all transactions necessary to complete the tasks in the chosen chain have been completed or that the entire chain has been abandoned due to the failure of any transaction.

Referring now to FIG. 5C, following completion of the automated bid/offer process for chain sponsorship, the adaptive system may perform sponsor reconciliation 510. For example, for chain sponsorship, the adaptive system collects the bid value from sponsors 30. For all successful chains which have associated sponsorship, the accrued sponsorship revenue may be collected from the sponsors 30. In some embodiments, user offers and incentives from sponsors may be reconciled. A transaction reconciliation 512 may also be performed. For enacted chains where either the developer 20 or system operator 50 has an agent or affiliate relationship with an end-point service, this process may collect and reconcile the appropriate fee from each end-point service where that relationship exists. Fees may be collected and reconciled corresponding to request generator 10 and/or end user offers and incentives from the EPS, for transmission to the user. In some embodiments, payment to the system operator 50 may be received for services provided by the adaptive system.

An attribution process 502 may be performed in which the adaptive system may attribute and share revenue according to one or more intelligence-driven algorithms. For example, revenue may be shared for $1^{st}$ through nth order shares against n-apps to their developers 20 on a cascading basis. In some embodiments, the share to each developer may be determined by a range of algorithms, such as, for example, the 'proximity' of their n-app to the original task. Some embodiments provide that revenue may be shared corresponding to incentives and offers to users.

The entire adaptive system may receive, provide and/or include real-time and near-real-time business intelligence processes, providing continuous feedback on system performance 514. The system performance 514 may be used to provide analytics 340 that may be provided to sponsors 30, end-point services 40, developers 20, system operators 50 and request generators 10. This is in addition to the 'standard' uses of business intelligence for monitoring and analysis of commercial performance and the adaptive system technical infrastructure.

A completion process 504 may be performed as a final stage of revenue reconciliation. The completion process 504 may include the transfer of the accrued value according to the attribution rules to adaptive system end users, request generators 10 and/or third party services. Some embodiments provide that value may be transferred in the form of direct monetary value, discounts against future enactments with the same sponsor or EPS, credit within the adaptive system that can be parlayed into any of the above.

Figure 6:
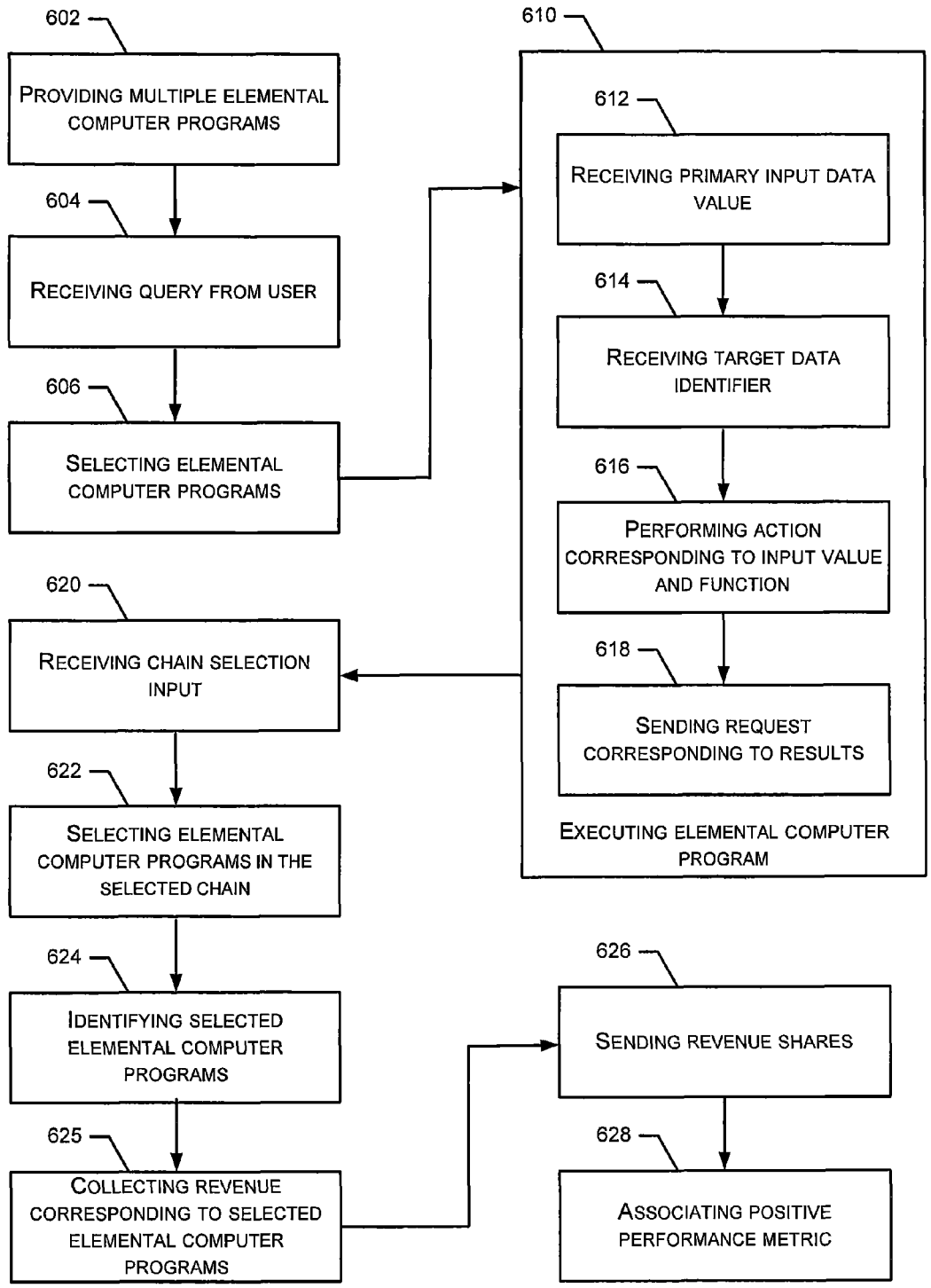
FIG. 6 is a flow diagram illustrating operations of methods, systems and computer program products according to some embodiments of the present invention.

Reference is now made to FIG. 6, which is a flow diagram illustrating operations of methods, systems and computer program products according to some embodiments of the present invention. Some embodiments of the present invention include providing multiple elemental computer programs for selective execution by an adaptive environment manager program (block 602). Elemental computer programs, also referred to as n-apps herein, may be operable to perform a single function, the identity of which is included in the elemental computer program, on data corresponding to a task or a portion of the task. In some embodiments, an elemental computer program may include one or more primary inputs, which may also be referred to as required inputs, and one or more optional inputs. An elemental computer program may be configured to perform an action corresponding to the function therein and generate a message based on a result of the function. Some embodiments provide that the elemental computer program makes no determination regarding its success or failure in achieving the task or portion thereof.

In some embodiments, a query may be received from a user either directly or through third-party service using an application programming interface (API) corresponding to the adaptive system (block 604). The query may include one or more requests and/or tasks. One or more of the elemental computer programs may be selected to provide target data corresponding to one or more of the requests (block 606).

Some embodiments provide that one or more of the elemental computer programs may be executed in response to a portion of a request received by an adaptive environment manager program (block 610). Executing an elemental computer program may include receiving, via the adaptive environment manager program, at least one input data value corresponding to a primary input of the elemental computer program (block 612). Some embodiments provide that an elemental computer program may only be selected for execution if the request includes input data corresponding to all of the primary inputs. In some embodiments, multiple input values corresponding to the primary input and one or more optional inputs of the elemental computer program may be received via the adaptive environment manager program. Some embodiments provide that a target data identifier that corresponds to a target value of the function in the elemental computer program may be received via the adaptive environment manager program (block 614). Executing the elemental computer program may further include performing an action corresponding to a received input and to the function that is identified in the elemental computer program (block 616).

Executing the elemental computer program may further include sending a request to the adaptive environment manager program corresponding to results from performing the performed action (block 618). For example in some embodiments, the elemental computer program may send a message requesting that the adaptive environment manager program generate a mutated version of the original request. The mutated version may include data indicating that the elemental computer program has been executed corresponding to this specific request. Additionally, the mutated version may include data corresponding to the target data and/or a portion thereof.

When an open request is identified by the adaptive environment manager program, the adaptive environment manager program may compare data included in the request to primary input data fields in multiple different ones of elemental computer programs. Any of the elemental computer programs having primary input data fields that match data in the request may be executed. In this regard, multiple different ones of the elemental computer programs may be simultaneously executing portions corresponding to a single open request. Additionally, each of these elemental computer programs may request a mutated version of the original request, which itself may be a mutated version of an earlier request. In this manner as each mutation of the request occurs via different ones of the elemental computer programs, an overall solution corresponding to the request may be approached.

Once the adaptive environment manager program determines that the request has been satisfied, the request may be marked as complete and the chain of multiple different elemental computer programs may be identified. In this manner, multiple iterative and adaptive solutions to complex requests may be generated by multiple different elemental computer programs that each may only address a very small portion of the request.

After the elemental computer programs have executed sufficiently to determine successful chains thereof, a chain selection input may be received from a user (block 620). Once the chain is selected, ones of the elemental computer programs in the selected chain may be selected by the adaptive environment manager program (block 622). Additionally, the selected elemental computer programs may be identified (block 624). In some embodiments, revenue may be collected from at least one of a sponsor and an end-point-service provider of the selected ones of the elemental computer programs in the selected chain (block 625). Shares of the revenue may be sent to different parties interacting with the adaptive system (block 626). For example some embodiments may include sending developer revenue shares to developers of the selected ones of the elemental computer programs in the selected chain. Similarly, some embodiments may include sending a portion of the collected revenue to a system operator of the computer system.

In some embodiments, after ones of the elemental computer programs in the selected chain are identified, a positive performance metric corresponding to those selected elemental computer programs may be generated and/or associated therewith (block 628). In contrast, ones of the elemental computer programs may not be associated with the positive performance metrics and in some cases, may be associated with a negative performance metric.

Figure 7:
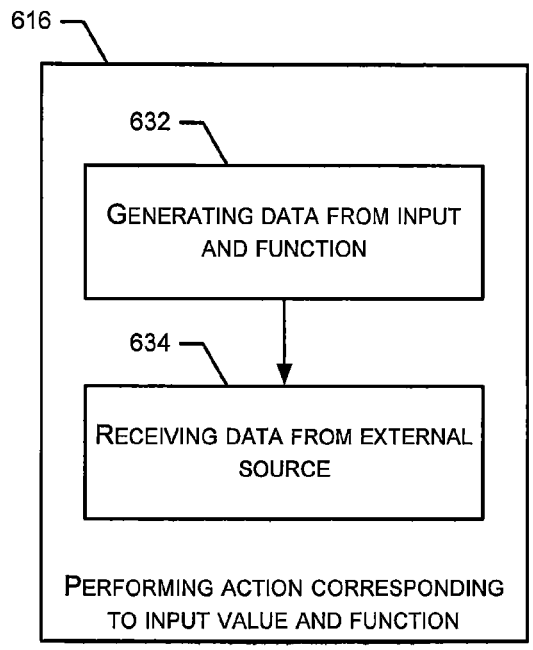
FIG. 7 is a flow diagram illustrating operations of methods, systems and computer program products according to some embodiments of the present invention.

Brief reference is now made to FIG. 7, which is a flow diagram illustrating operations of methods, systems and computer program products according to some embodiments of the present invention. Specifically, FIG. 7 illustrates operations that may be included in the operations of performing an action corresponding to the input value and function in an elemental computer program (block 616). In some embodiments, performing the action corresponding to the received input and the function includes generating data corresponding to the received input that was received based on functionality residing within the elemental computer program (block 632). Some embodiments provide that performing the action may also include receiving data from an external data source that is unrelated to the computer system and/or the adaptive system (block 634). In some embodiments, the external data source includes a third party data provider, a third party service provider and/or a user via a user interface.

Figure 8:
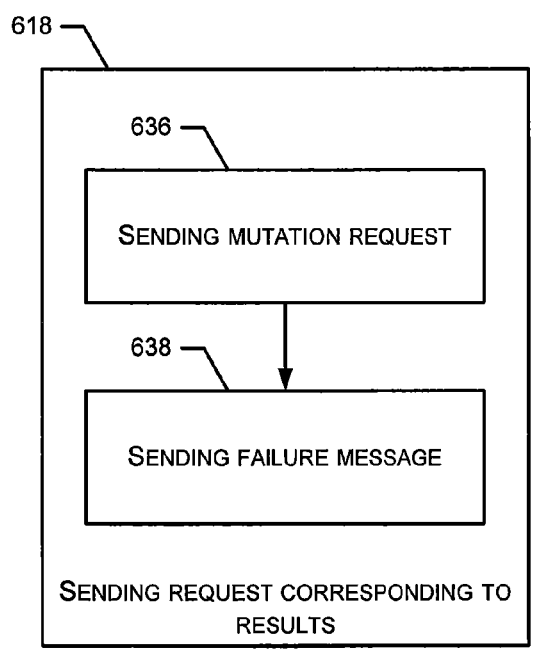
FIG. 8 is a flow diagram illustrating operations of methods, systems and computer program products according to some embodiments of the present invention.

Brief reference is now made to FIG. 8, which is a flow diagram illustrating operations of methods, systems and computer program products according to some embodiments of the present invention. Specifically, FIG. 8 illustrates operations that may be included in the operations of sending request corresponding to results generated in the elemental computer program (block 618). In some embodiments, sending the request to the adaptive environment manager corresponding to results from performing the performed action includes sending a mutation request to modify the request received by the adaptive environment manager program (block 636). Some embodiments provide that the mutation request includes mutation data for modifying the request received by the adaptive environment manager program. In some embodiments, the mutation data includes a source field that includes an identity of the elemental computer program and data corresponding to a target value of the function in the elemental computer program. The identity of the elemental computer program may be used to generate a history of different elemental computer programs that have been executed corresponding to the original and/or mutated request. In some embodiments, sending the request includes sending a failure message indicating that the function in the elemental computer program did not provide data corresponding to a target value of the function in the elemental computer program (block 638).

Figure 9:
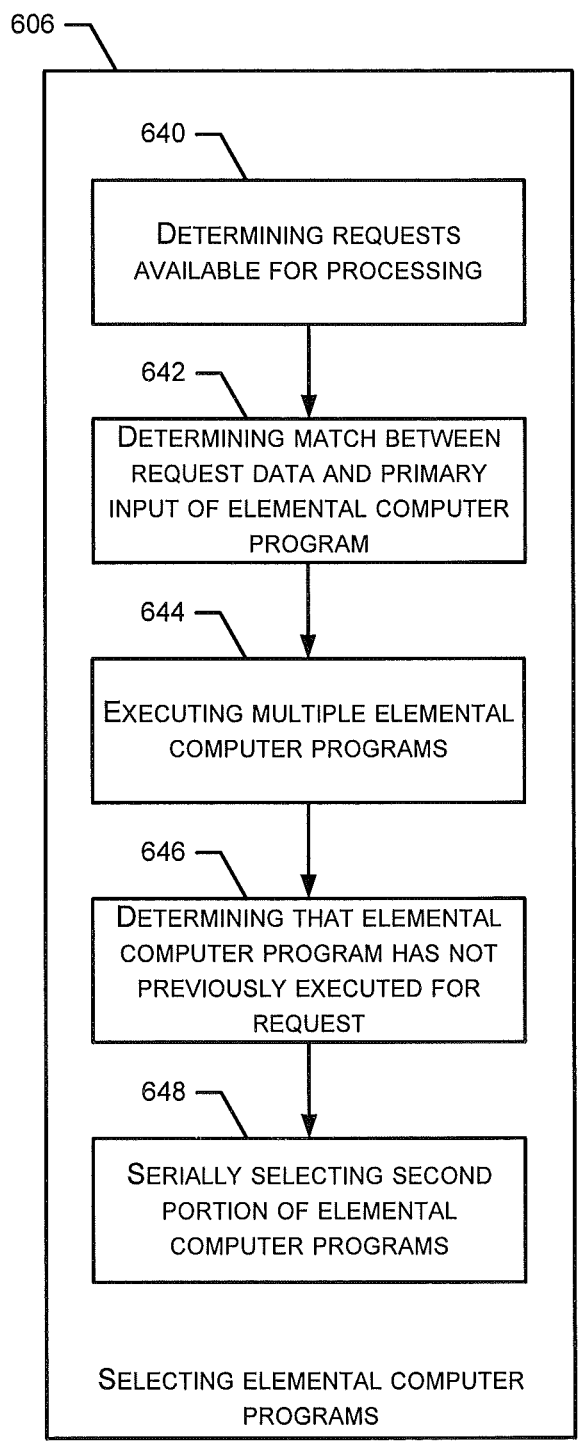
FIG. 9 is a flow diagram illustrating operations of methods, systems and computer program products according to some embodiments of the present invention.

Reference is now made to FIG. 9, which is a flow diagram illustrating operations of methods, systems and computer program products according to some embodiments of the present invention. Specifically, FIG. 9 illustrates operations that may be included in the operations of selecting elemental computer programs in response to the request (block 606). Some embodiments provide that selecting an elemental computer program includes determining which of multiple different requests are available to be processed by one or more elemental computer programs (block 640). For example, in some embodiments, certain requests may have dependencies that have not been satisfied and thus are not ready to be received by elemental computer programs. Additionally, a request that is marked as complete is no longer available for processing by elemental computer programs.

In some embodiments, selecting elemental computer programs may include determining a match between a data value in ones of the available requests with one or more primary inputs in elementary computer programs (block 642). In some embodiments, two or more of the elemental computer programs may be executed responsive to determining the match between the data value in ones of the requests and the primary inputs in the different ones of the elemental computer programs (block 644). For example, some embodiments include executing two or more of the elemental computer programs based on different data values in the same one of the requests. In this manner, multiple different chains of serially arranged elemental computer programs may be generated in parallel. Additionally, different ones of the requests may be modified requests based on a previously occurring processing by different ones of the elemental computer programs that provided a portion of target data corresponding to the request.

Some embodiments provide that selecting an elemental computer program includes determining that the elemental computer program has not been previously executed for the same request (block 646). In some embodiments, selecting an elemental computer program includes serially selecting a portion of the elemental computer programs to provide the target value corresponding to the request (block 648). Some embodiments provide that the portion of the elemental computer programs that are serially selected are a chain of elemental computer programs that provide the target value. As discussed above, multiple different chains of elemental computer programs may be generated in response to a request. Each of the different chains of elemental computer programs may include different combinations of different elemental computer programs. In this manner, an end-user may be presented with multiple different solutions corresponding to the request.

Figure 10:
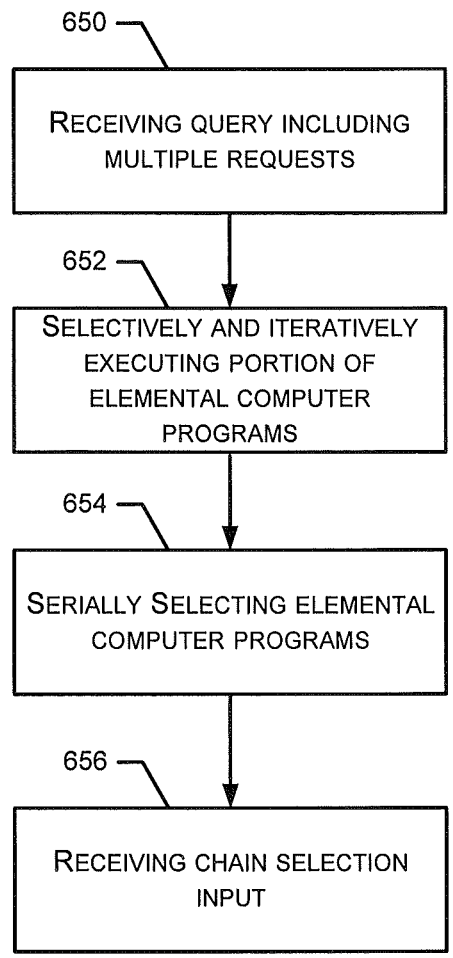
FIG. 10 is a flow diagram illustrating operations of methods, systems and computer program products according to some embodiments of the present invention.

Reference is now made to FIG. 10, which is a flow diagram illustrating operations of methods, systems and computer program products according to some embodiments of the present invention. Operations according to some embodiments of the present invention include receiving a query that includes multiple requests (block 650). In some embodiments, the request may include target data that corresponds to different respective attributes of the query. Operations may further include selectively and iteratively executing a portion of multiple elemental computer programs (block 652). Some embodiments provide that the multiple elemental computer programs are configured to be executed to provide a portion of target values corresponding to respective ones of the requests. In this manner, more than one of the elemental computer programs are executed to provide, in aggregate, target values corresponding to the target data. In some embodiments, ones of the elemental computer programs are configured to access one or more external services and/or sources to provide the respective portions of the target values.

Some embodiments further include serially selecting multiple ones of the elemental computer programs that are executed to provide the target values corresponding to the request (block 654). In some embodiments, the portion of the elemental computer programs that are serially selected are a chain of elemental computer programs that provide the target value. Some embodiments provide that multiple chains of elemental computer programs may be generated responsive to a given request. In this manner, an end-user may be presented with multiple different solutions. Once the end-user chooses a proposed solution, a chain selection input is received (block 656). Based on the chain selection, the selected ones of the elemental computer programs may be identified and a positive performance metric may be associated with those elemental computer programs. In this manner, the performance of the elemental computer programs may be evaluated and the relative performance among the elemental computer programs may be ranked. In some embodiments, the evaluation data may be shared with elemental computer program developers, who may modify or revise and/or improve the elemental computer programs. Elemental computer programs having higher ranks or greater success rates may be up-selected while those having lower ranks or poor performance may be down-selected and/or eliminated.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

What is claimed is:

1. A computer system, comprising:
a processor; and
a memory coupled to the processor, the memory comprising computer readable program code embodied therein that, when executed by the processor, causes the processor to perform any of the operations comprising:
executing an elemental computer program in an adaptive environment in the computer readable program code responsive to a portion of a request received by an adaptive environment manager program corresponding to the adaptive environment,
wherein the elemental computer program, when executed by the processor, causes the processor to perform operations comprising:
receiving, via the adaptive environment manager program, at least one input data value corresponding to a primary input of the elemental computer program;
performing an action corresponding to the at least one input that was received and to a function that is identified in the elemental computer program; and
sending a request to the adaptive environment manager corresponding to results from performing the performed action,
wherein sending the request to the adaptive environment manager program corresponding to results from performing the performed action comprises:
sending a failure message responsive to the function in the elemental computer program not providing data corresponding to a target value of the function in the elemental computer program; and
sending a mutation request to the adaptive environment manager program to modify the request received by the adaptive environment manager program and that includes mutation data for modifying the request received by the adaptive environment manager program, wherein the mutation data includes data corresponding to a target value of the function in the elemental computer program, wherein the mutation data includes a source field that includes an identity of the elemental computer program.

2. The computer system according to claim 1, wherein the elemental computer program, when executed by the processor, causes the processor to perform operations further comprising receiving, via the adaptive environment manager program, a plurality of input data values that correspond to the primary input and at least one optional input of the elemental computer program.

3. The computer system according to claim 1, wherein the elemental computer program, when executed by the processor, causes the processor to perform operations further comprising receiving, via the adaptive environment manager program, a target data identifier that corresponds to a target value of the function in the elemental computer program.

4. The computer system according to claim 1, wherein performing the action corresponding to the at least one input that was received and to the function that is identified in the elemental computer program comprises generating data corresponding to the at least one input that was received based on functionality residing within the elemental computer program.

5. The computer system according to claim 1, wherein performing the action corresponding to the at least one input that was received and to the function that is identified in the elemental computer program comprises receiving data from an external data source, wherein the external data source is separate from and communicatively connected to the computer system.

6. The computer system according to claim 5, wherein the external data source includes a third party data provider, a third party service provider and/or a user via a user interface.

7. The computer system according to claim 1, before executing the elemental computer program, operations further comprising:
providing a plurality of elemental computer programs for selective execution by the adaptive environment manager program;

receiving a query from a user via an application programming interface (API), the query including plurality of requests; and selecting at least one of the plurality of elemental computer programs to provide target data corresponding to at least one of the plurality of requests.

8. The computer system according to claim 7, wherein selecting the at least one of the plurality of elemental computer programs comprises:

determining multiple ones of the plurality of requests that are available to be processed by one or more of the plurality of elemental computer programs; and determining a match between a data value in the multiple ones of the plurality of requests with any primary input in ones of the plurality of elemental computer programs.

9. The computer system according to claim 8, wherein selecting the at least one of the plurality of elemental computer programs further comprises executing two or more of the plurality of elemental computer programs responsive to determining the match between the data value in ones of the plurality of requests and the primary inputs in the multiple ones of the plurality of elemental computer programs.

10. The computer system according to claim 9, wherein selecting the at least one of the plurality of elemental computer programs further comprises executing two or more of the plurality of elemental computer programs based on different data values in the same one of the plurality of requests.

11. The computer system according to claim 7, wherein one of the plurality of requests is a modified request based on a previously occurring processing by a first one of the plurality of elemental computer programs that provide a portion of target data corresponding to the request.

12. The computer system according to claim 7, wherein selecting the at least one of the plurality of elemental computer programs further comprises determining that the at least one of the plurality of elemental computer programs has not been previously executed for the same one of the plurality of requests.

13. A computer system, comprising:

a processor; and a memory coupled to the processor, the memory comprising computer readable program code embodied therein that, when executed by the processor, causes the processor to perform any of the operations comprising:

providing a plurality of elemental computer programs in an adaptive environment for selective execution by an adaptive environment manager program corresponding to the adaptive environment;

receiving a query from a user via an application programming interface (API), the query including plurality of requests; and selecting at least one of the plurality of elemental computer programs to provide target data corresponding to at least one of the plurality of requests;

executing the at least one elemental computer program of the plurality of elemental computer programs in the computer readable program code responsive to a portion of a request received by an adaptive environment manager program, wherein the at least one elemental computer program of the plurality of elemental computer programs, when executed by the processor, causes the processor to perform operations comprising:

receiving, via the adaptive environment manager program, at least one input data value corresponding to a primary input of the at least one elemental computer program of the plurality of elemental computer programs;

performing an action corresponding to the at least one input that was received and to a function that is identified in the at least one elemental computer program of the plurality of elemental computer programs; and sending a request to the adaptive environment manager corresponding to results from performing the performed action, wherein selecting the at least one elemental computer program of the plurality of elemental computer programs comprises serially selecting a portion of the plurality of elemental computer programs to provide the target value corresponding to the request, wherein the portion of the plurality of elemental computer programs that are serially selected are a chain of elemental computer programs that provide the target value;

receiving a chain selection input corresponding to selecting one of a first chain or a second chain;

identifying the selected ones of the plurality of elemental computer programs in the selected chain; and collecting revenue from at least one of a sponsor and an end-point-service provider of the selected ones of the plurality of elemental computer programs in the selected chain.

14. The computer system according to claim 13, wherein the chain of elemental computer programs includes the first chain, wherein the portion of the plurality of elemental computer programs comprises a first portion of the plurality of elemental computer programs, and wherein selecting the at least one elemental computer program of the plurality of elemental computer programs further comprises, independently of the first chain, serially selecting a second portion of the plurality of elemental computer programs to provide the target value corresponding to the request, wherein the second portion of the plurality of elemental computer programs that are serially selected are the second chain of elemental computer programs that provide the target value.

15. The computer system according to claim 13, further comprising sending developer revenue shares to developers of the selected ones of the plurality of elemental computer programs in the selected chain.

16. The computer system according to claim 13, further comprising sending a portion of the collected revenue to a system operator of the computer system.

17. The computer system according to claim 13, further comprising:

identifying the selected ones of the plurality of elemental computer programs in the selected chain; and associating a positive performance metric corresponding to the selected ones of the plurality of elemental computer programs in the selected chain, wherein unselected ones of the plurality of elemental computer programs are not associated with the positive performance metric.

18. A method comprising:

receiving a query that includes a plurality of requests, each including target data and corresponding to different respective attributes of the query;

selectively and iteratively executing a portion of a plurality of elemental computer programs in an adaptive environment responsive to different ones of the plurality of requests, wherein ones of the plurality of elemental computer programs are configured to be executed to provide a portion of target values corresponding to respective ones of the plurality of requests, wherein more than one of the plurality of elemental computer programs are executed to provide, in aggregate, target values corresponding to the target data, wherein the portion of the plurality of elemental computer programs that are serially selected are a chain of elemental computer programs that provide the target value, wherein the chain of elemental computer programs includes a first chain, wherein the portion of the plurality of elemental computer programs comprises a first portion of the plurality of elemental computer programs, wherein serially selecting the more than one of the plurality of elemental computer programs further comprises, independently of the first chain, serially selecting another portion of the plurality of elemental computer programs to provide the target value corresponding to the request, wherein the another portion of the plurality of elemental computer programs that are serially selected are a second chain of elemental computer programs that provide the target value, and wherein ones of the plurality of elemental computer programs are configured to access one or more external services and/or sources to provide the respective portions of the target values.

19. The method according to claim 18, further comprising serially selecting the more than one of the plurality of elemental computer programs that are executed to provide the target values corresponding to the request.

20. The method according to claim 18, further comprising receiving a chain selection input corresponding to selecting one of the first chain or the second chain.

21. The method according to claim 20, further comprising:
   identifying the selected ones of the plurality of elemental computer programs in the selected chain; and
   associating a positive performance metric corresponding to the selected ones of the plurality of elemental computer programs in the selected chain, wherein unselected ones of the plurality of elemental computer programs are not associated with the positive performance metric.

* * * * *